United States Patent [19]
Wilson

[11] Patent Number: 6,032,207
[45] Date of Patent: Feb. 29, 2000

[54] SEARCH MECHANISM FOR A QUEUE SYSTEM

[75] Inventor: Peter J. Wilson, Leander, Tex.

[73] Assignee: Bull HN Information Systems Inc., Billerica, Mass.

[21] Appl. No.: 08/994,882

[22] Filed: Dec. 19, 1997

Related U.S. Application Data

[60] Provisional application No. 60/033,834, Dec. 23, 1996.

[51] Int. Cl.[7] ............................................. G06F 7/02
[52] U.S. Cl. .......................... 710/54; 710/52; 707/3; 707/102
[58] Field of Search ............................ 707/3, 102, 1, 707/100; 710/52, 54

[56] References Cited

U.S. PATENT DOCUMENTS 5,327,557  7/1994  Emmond ................................. 707/3
5,418,947  5/1995  Hsu et al. .............................. 707/1
5,671,406  9/1997  Lubbers et al. ......................... 707/7

*Primary Examiner*—Thomas C. Lee
*Assistant Examiner*—Albert Wang
*Attorney, Agent, or Firm*—Faith F. Driscoll; John S. Solakian

[57] ABSTRACT

A search mechanism improves the performance of a queue system including a queue for storing a plurality of data items and search mechanism by maintaining a key cache data structure having an array of entries, each of which have a key field and a pointer field. The key and pointer fields respectively of each cache entry are used for storing a key value of a different one of the enqueued data items of the queue and a pointer to that enqueued item. The key of each data item to be enqueued is used to generate an index value for accessing a location of the key cache array to obtain immediate access to the corresponding enqueued data item thereby reducing the search time for determining the proper point within the queue for inserting the data item to be added.

15 Claims, 13 Drawing Sheets

SEARCH MECHANISM FOR A QUEUE SYSTEM

This patent application claims the benefit of Provisional Application Ser. No. 60/033,834, filed on Dec. 23, 1996.

BACKGROUND OF THE INVENTION

1. Field of Use

The present invention relates to data processing system and more particularly to queuing systems.

2. Related Art

A frequent activity in data processing systems is the enqueueing of a data item. Typically, these systems maintain many queues internally. Often, the queues correspond to waiting-lines of work to be done by the data processing system so that when an item is to be added to the queue, the queue system simply appends the item to the end of the queue and when an item is to be removed, the queue system removes the item from the front of the queue.

Sometimes the items in a queue system must be held in the queue in a particular order which is dependent upon a particular field or fields contained in the item. An example is where the queue system functions as a scheduler and represents the tasks to be executed by the data processing system. In such cases, each of the data items normally contains a field representing the priority of the task and the data items representing low priority tasks are enqueued after the data items representing higher priority tasks. To add such a low priority data item to the queue system, the simplest implementation requires that the queue insertion mechanism perform a sequential search of the queue beginning with the data item at the front of the queue system and examining each enqueued data item in turn until the insertion mechanism locates a data item having a priority which is the same or lower than the priority of the data item to be inserted into the queue system.

When the queue system contains many data items, the sequential search can require a substantial amount of time thereby detracting from the overall efficiency of the data processing system. In general, the search time grows linearly with the number of data items in the queue system.

A queue is generally represented in a data processing system by a data structure to implement the queue itself along with multiple data structures for each of the data items. That is, each data item contains fields for its data in addition to extra fields for implementing the queue structure. Generally, a simple queue implements the queue structure as a single data item which corresponds to the memory address of the first queued data item and each data item has one field dedicated to the queue structure which contains the memory address of the next data item in the queue.

Alternative queue data structures are well known to those skilled in the art. A variation of the simple queue structure is the double linked list organization which contains two fields per data item, one field containing the memory address of the next enqueued data item and the other field containing the memory address of the preceding data item in the queue. This organization simplifies the addition and removal of data items from the middle of the queue by being able to search for data items in either a forward or backward direction. Thus, while a simple ordered queue has very efficient insertion and removal of data items, there is still a substantial search burden when the size of the queue is substantial.

Another known queue data structure is one representing the ordered queue as a tree-shaped data structure with the branching of the tree being dependent on the value of the key field or fields so that search time can grow as the logarithm base two of the number of items in the tree provided that the tree is balanced. Unfortunately, maintaining the tree in a balanced state is expensive when there are frequent additions and removals of data items.

Another known queue data structure is a "skip list" which holds multiple copies of a data item in multiple queues. The lowest level queue contains all of the items to be enqueued while the higher level queues hold just a subset of items chosen at random from the immediate lower queue. In this arrangement, a search proceeds from the highest level queue, migrating down to the next lower level queue when a pseudo match is obtained. This queue structure is less expensive to maintain than a balanced tree queue structure and provides probabilistic speedups in search time. But, the structure pays a penalty in terms of memory space (i.e. multiple copies of the data items are needed) and its insertion and deletion mechanisms are more expensive as compared to the simple queue structure.

Accordingly, it is a primary object of the present invention to provide an efficient, probabilistic search mechanism for ordered queues.

It is a further object of the present invention to provide an efficient search mechanism which provides for efficient insertion and removal of data items.

SUMMARY OF THE INVENTION

The above objects are achieved in a preferred embodiment of the search mechanism of the present invention for queues holding or containing data items ordered according to the value of one or more fields contained in the data item. The queue can be considered conventional in design. For example, the queue contains data items, each of which has a pair of queue specific data fields which indicate the locations of preceding data item and succeeding data item in addition to containing a further data structure containing two pointer fields which indicate the first data item and last data item in the queue. Additionally, in the preferred embodiment, the queue always maintains a first item and a last item which may not be removed. The first item contains a key value which is less than any real key value and the last item contains a key value which is larger than any real key value. In this embodiment, the items in the queue contain key values which are in ascending order; that is, the item following any item in the queue has a key which is the same as or greater than the given item.

It will be clear that an equivalent embodiment of the present invention using key values in descending order and with the key values in the first and last items respectively being set to a value larger than any real key value and a value smaller than any real key value is practical and will operate in a manner analogous to the present embodiment.

The search mechanism of the present invention includes one or more data structures contained in a key cache. The key cache is an array of data item entries, each of which contains two fields, a key field used for storing a unique key value and a pointer field used for designating a data item in the queue. The key cache may have as many such data item entries as convenient. In the preferred embodiment, the data item entries are numbered consecutively from 0 to some number n when the key cache contains n+1 items.

In operation, initially, the key cache and queue are empty and this condition is represented by having the pointer field of each key cache entry contain an invalid value which is typically zero. When a data item it to be added to the queue, the queue system generates an index by performing a computation operation using the key value of the new data item. The result of the computation operation yields an index value between 0 and n which is used to index into the key cache. For example, if the computation operation result yields the value x, then the xth entry in the key cache is accessed.

Next, the search mechanism determines if the key cache entry is valid or not valid (i.e. has a value=0). If invalid, the search mechanism updates the key cache entry so that the key field contains the key value of the new data item. Next, the search mechanism searches the queue from the front and inserts the new data item into the queue in a conventional manner. If the key cache entry is valid, then the search mechanism examines the key field of the entry as follows. If the key field of the key cache entry contains a value which is the same as the key of the data item to be inserted, the search mechanism inserts the new data item into the queue at a point immediately before the data item designated by a search mechanism pointer field and updates the key cache pointer field to point at the new data item. If the key field of the key cache entry contains a value which is smaller than key of the data item to be inserted, then the search mechanism searches the entries of the queue "backwards" from the data item designated by the search mechanism pointer field until the search mechanism finds an insertion point. If the key field of the key cache entry is larger than the key of the data item to be inserted, the search mechanism searches the entries of the queue "forwards" until the search mechanism finds an insertion point. In either of these last two cases, the search mechanism updates both the key and pointer fields of the appropriate key cache entry to contain the key value of the new data item and to point to it.

The search mechanism of the present invention removes queue data items in an expeditious manner. When a data item is removed from the front of the queue, the search mechanism examines the corresponding entry location (key cache slot) in the key cache. If the key value of the key cache entry designates this data item, the search mechanism marks the contents of the location as invalid.

The search mechanism of the present invention reduces the number of queue entries required to be searched by an amount which is a function of the distribution of key values and the size of the key cache data structure. When used in different applications, the present invention is able to reduce search time and improve overall system performance.

The above objects and advantages of the present invention will be better understood from the following description when taken in conjunction with the accompanying drawings.

DESCRIPTION OF THE PREFERRED EMBODIMENT

FIG. 1

Figure 1:
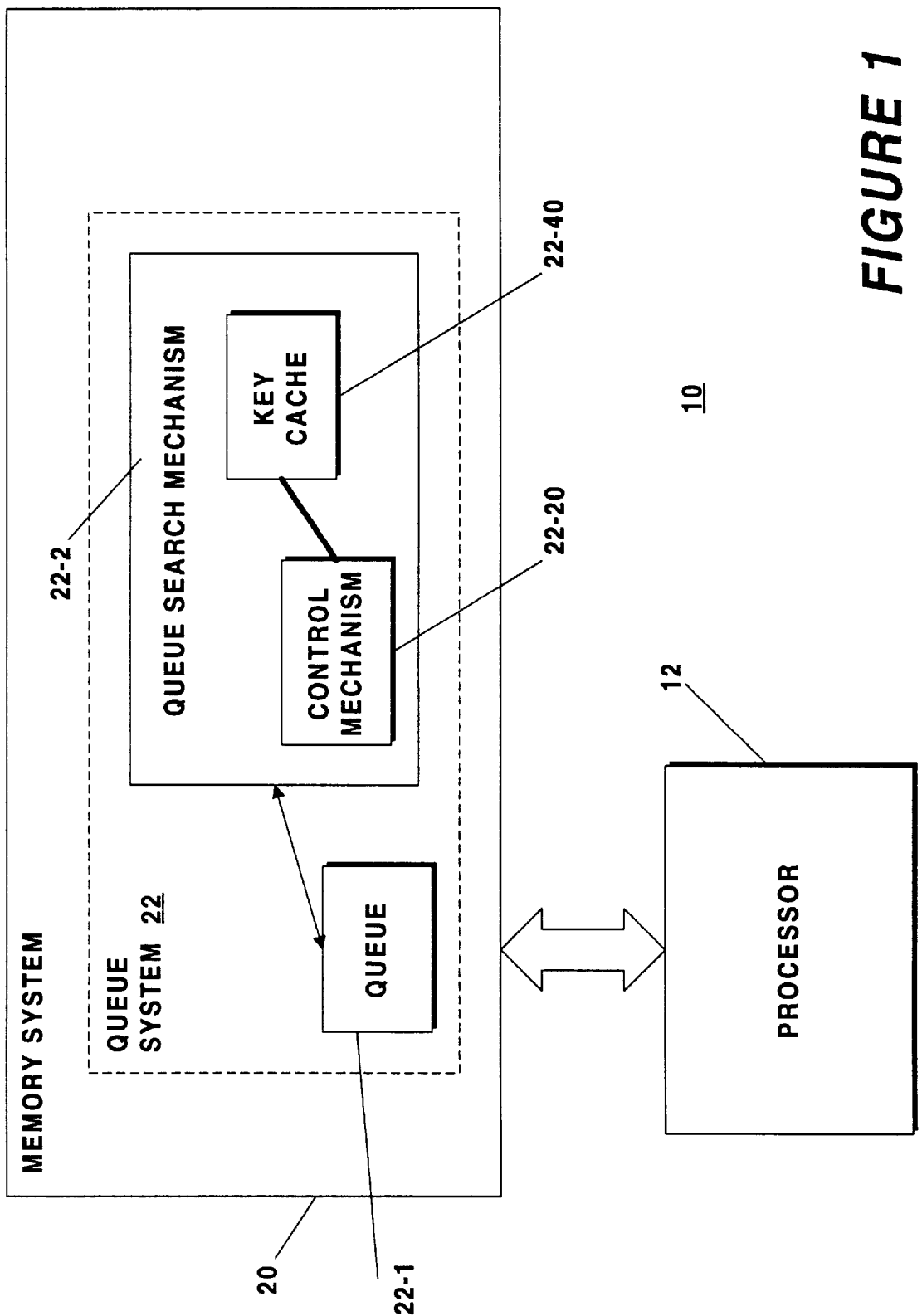
FIG. 1 is an overall block diagram of a data processing system which utilizes the search mechanism of the present invention.

FIG. 1 is a block diagram of a conventional data processing system 10 which includes a processor 12 which couples to a memory system 20. The processor 12 operatively couples to a queue system 22 which includes the queue search mechanism 22-2 constructed according to the teachings of the present invention to manage a conventional queue structure 22-1. As shown, the queue search mechanism 22-2 includes a key cache structure 22-40 and a control mechanism 22-20 which contains procedures for performing queue insertion and removal operations for queue 22-1 according to the teachings of the present invention.

FIG. 2

Figure 2:
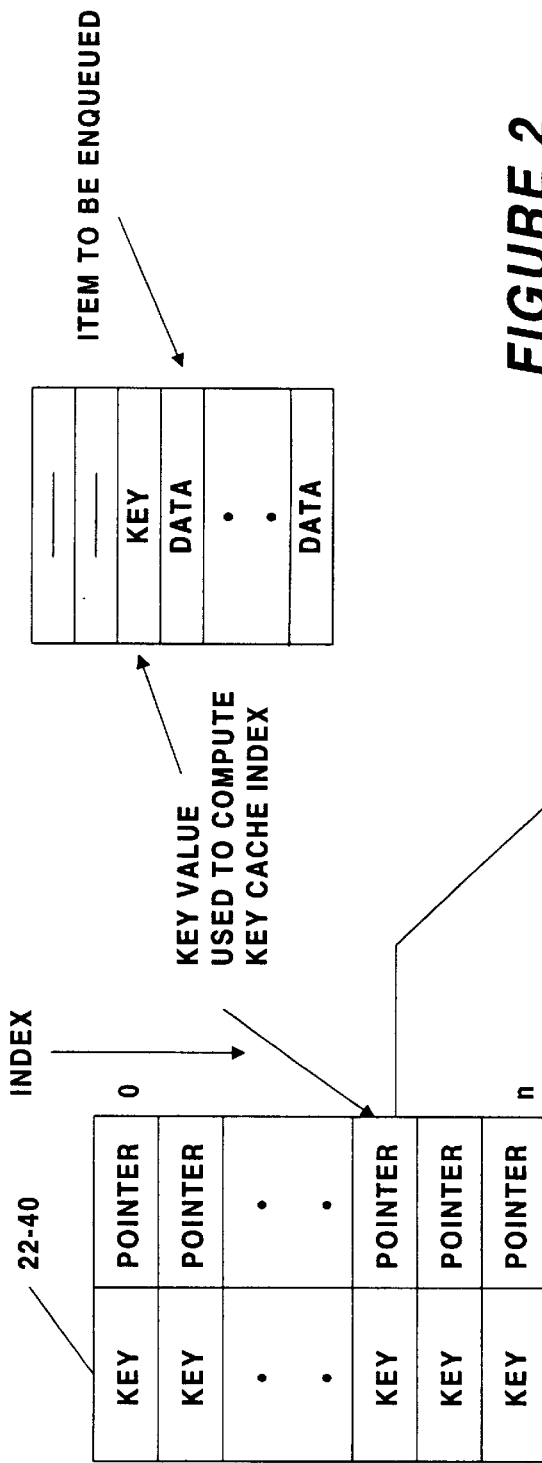
FIG. 2 shows in greater detail, the organization of the queuing system of FIG. 1 which incorporates the search mechanism of the present invention.
Figure 2:
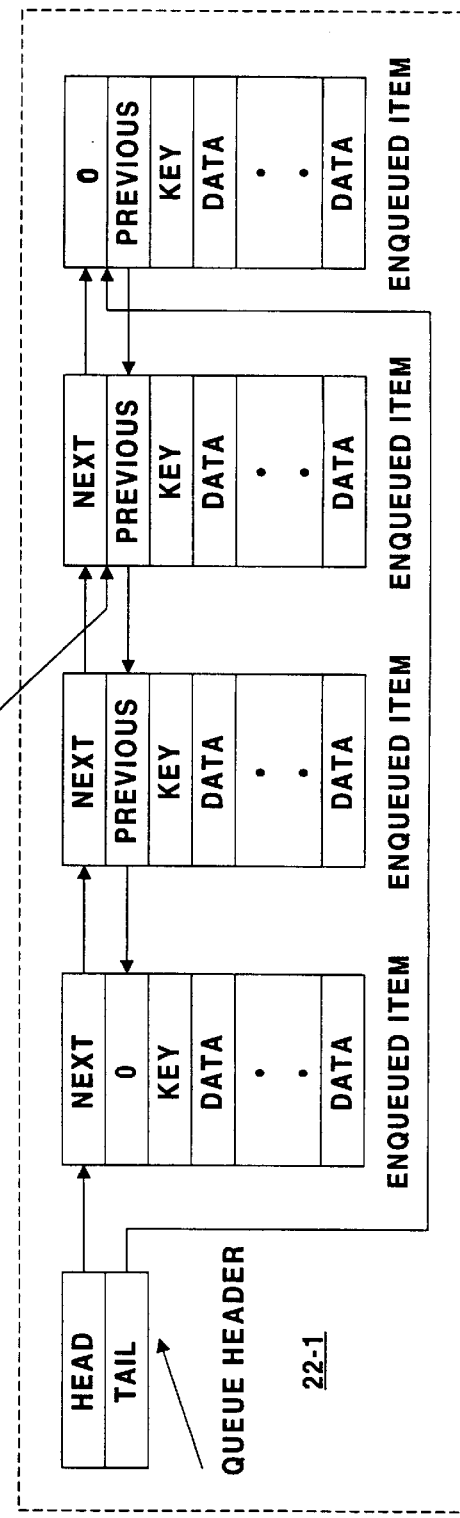

FIG. 2 shows in greater detail, the organization of queue system 22. As shown, the key cache 22-40 is an array which contains a plurality of entry locations for storing items, each item in the form of a data structure containing a key field for storing a key value and a pointer field for storing a queue address pointer value.

The key value may represent a particular time or priority allocation. For example, when the queue system 22 being used to process events in a discrete event simulator, each event represents some important activity of the system being modeled and each event contains an indication of the time the action is supposed to occur and the details of what action is to be taken. This time value is used as the key field.

In this application, the intended time of the new item is used to select an entry in the key cache structure 22-40. In this example, the intended time of the new item is used to select an entry in the key cache structure 22-40. In such an application, the simulation may be modeling the behavior of a microprocessor in which increments of time of one nanosecond are used as the time value. When the simulation is handling the simulation of the 100,0000th instruction to be executed, the time and hence the key value could have a value of 200,000. In such an application, the computation of Index from Key value and the size of the cache are jointly chosen so as to distribute the index value approximately uniformly over the size of the key cache.

In implementing the queue system to accommodate this application, each item in the queue is represented by a data structure which contains a key field for the intended time, a pointer field to represent the type of action needed implemented as the address of a procedure which can carry out the specified action in addition to backward and forward pointer fields as discussed herein. In this application, the search mechanism 22-2 performs a mathematical function on the time contained in the key field of the item which produces a result having a range of 0 through n where there are n+1 entry locations in the key cache structure 22-40. Typically, the function computes the remainder when the key value (i.e. the time) is divided by n+1.

To insert a new data item, "NewItem" for time T, the following general series of operations are performed:

--- set Ptr, a pointer, equal to the value of Head
set Searching to TRUE
while Searching is TRUE
   if Ptr.Time is greater than T

```
insert NewItem before Ptr
set Searching to FALSE
otherwise set Ptr to Ptr.Next
``` wherein "insert" means to perform all of the required operations to put the NewItem into the queue.

The search mechanism of the present invention reduces the number of times required to execute the while loop by also maintaining the key cache structure 22-40 of FIG. 2 as described herein.

In addition to the key cache structure 22-40, FIG. 2 shows in greater detail, the organization of the queue 22-1. As indicated, queue 22-1 includes head and tail pointers within a queue header structure and a number of enqueued items. Each item has a next and previous pointer fields (forward and backward linked pointers), a key field and a number of data fields. In FIG. 2, four enqueued items of the queue 22-1 are shown with their respective next and previous pointer fields being set to values such that the fifth key cache entry points to the third enqueued item of queue 22-1. In the preferred embodiment, the queue 22-1 is structured so that the queue always contains a First item and a Last item which have respectively, a key value smaller than any to be used by the application and a key value larger than any to be used by the application. This simplifies the insertion and deletion mechanisms, since they then do not need to check for insertion into an empty queue, the head of the queue or the tail of the queue, nor for deletion from such sites.

DESCRIPTION OF OPERATION

With reference to FIGS. 1 through 5b, the operation of the queue search mechanism 22-2 constructed according to the present invention will now be described in conjunction with the flow charts of FIGS. 6a through 6e.

FIG. 3a

First, the queue system 22 is initialized by system 10 of FIG. 1. More specifically, key cache structure 22-40 is an array containing n number of entries, each having a key field and a pointer field. After being initialized, the key field of each entry contains a different key value derived as discussed above while the pointer field contains a "0" value as indicated. The head and tail pointers of queue 22-1 also contain "0" values as shown.

Figure 3A:
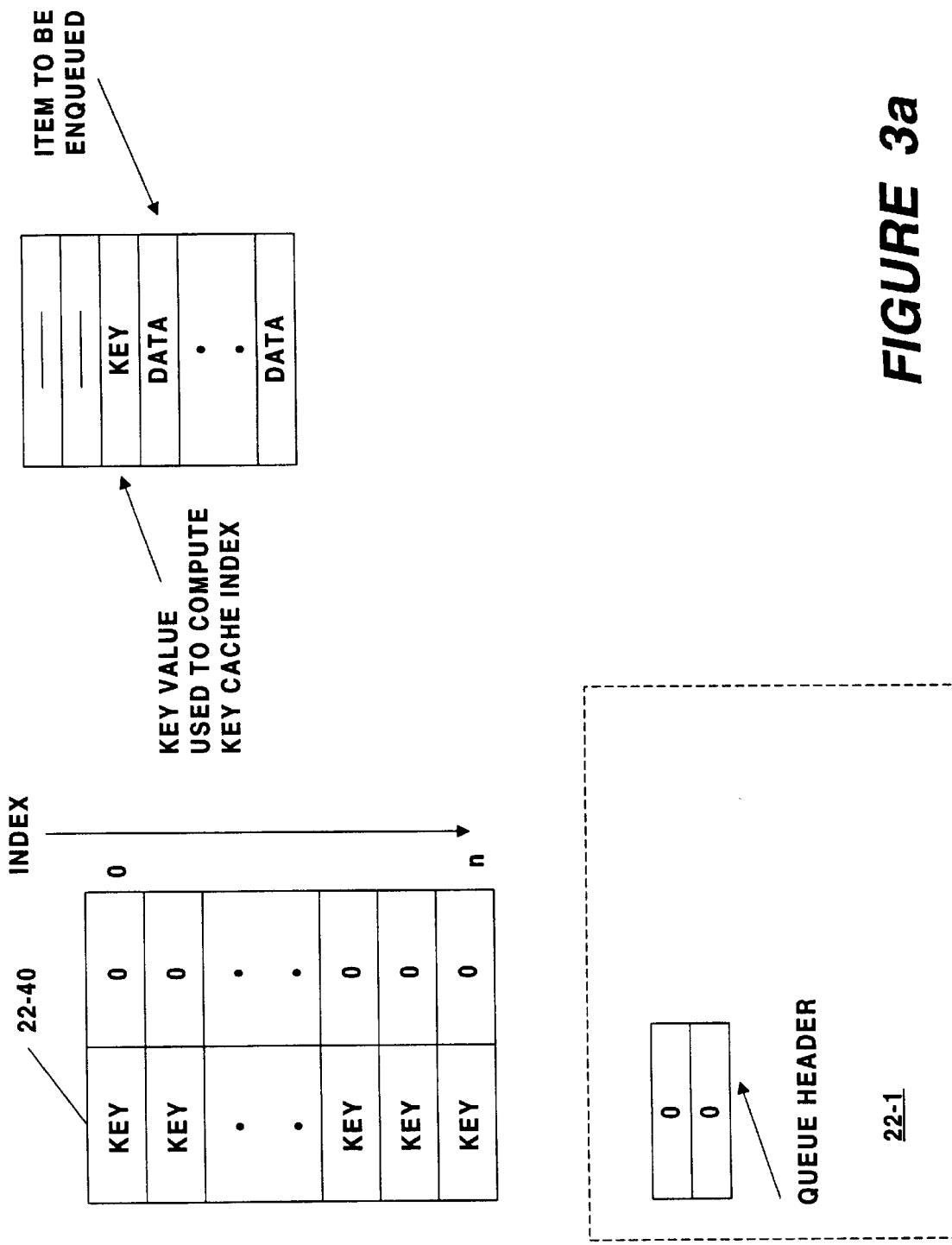
FIGS. 3a and 3b are diagrams used in describing the steps of performing an insertion operation for an empty queue according to the teachings of the present invention.
Figure 3B:
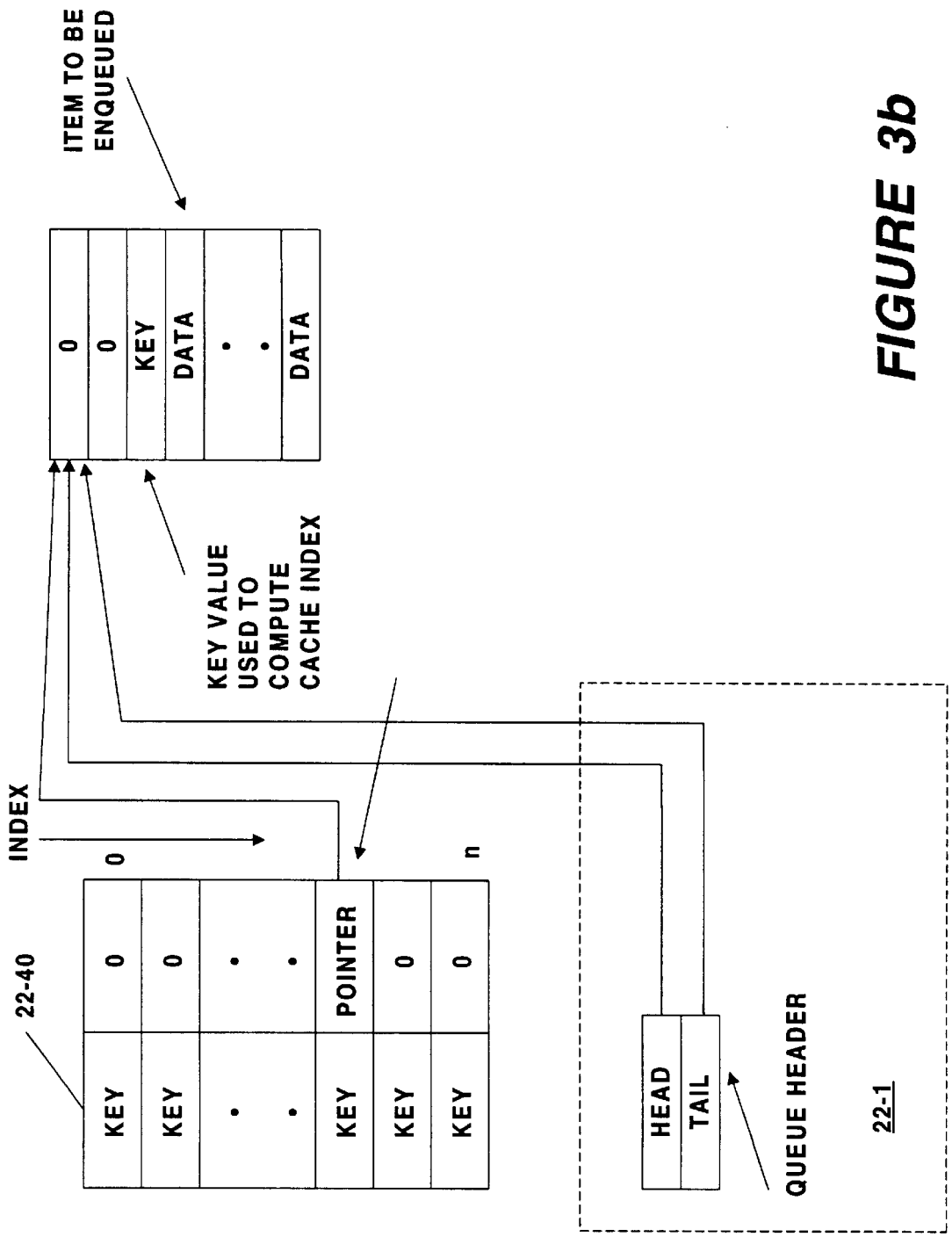

FIG. 3b illustrates the state of the queue system 22 after the first data item (NewItem) has been enqueued properly. Since this is the first data item, its next and previous pointers are both set to "0" as indicated. The control mechanism 22-20 computes the cache index value from the key value. In the case of the time event simulator application, this is done by performing the operation of T % N wherein % denotes a remainder operation as discussed herein. The result "x" defines the entry location within the key cache structure 22-40 into which the new item is to be inserted as indicated in FIG. 3b.

In an application in which the behavior of a microprocessor is being simulated through the means of a discrete event simulation, the key value may be some multiple of the base clock interval of the simulated processor. In an example where the clock interval is 10 nanoseconds and the execution of the 10,000th instruction is being simulated, the key value might plausibly have a value such as 20,000. In that case, if the key cache contained 24 entries the index would be 20,000% 24, or 8 wherein the symbol "%" designates the remainder obtained by dividing 20,000 by 24 which results in the remainder of 8.

Figure 4A:
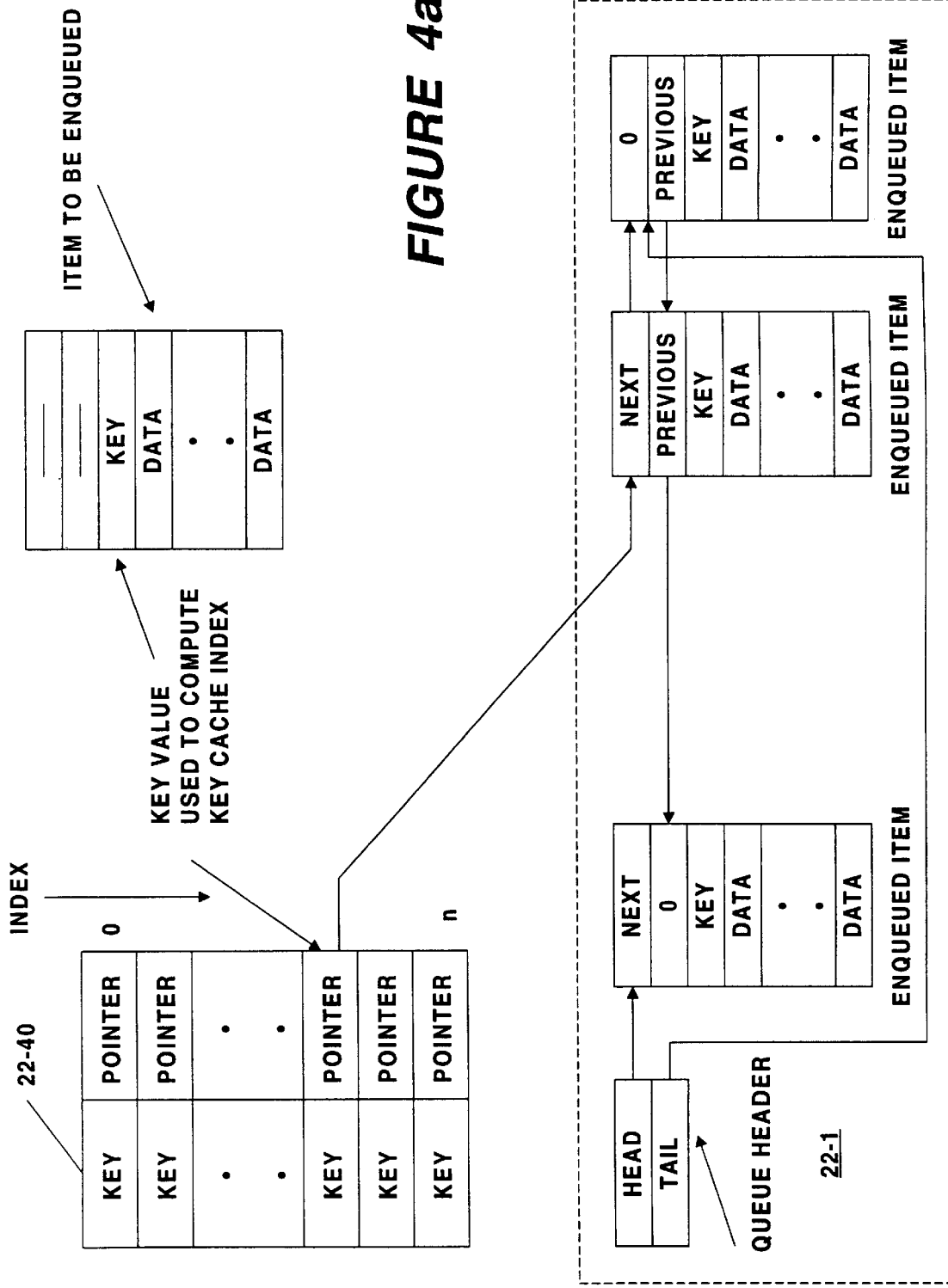
FIGS. 4a and 4b are diagrams used in describing the steps of performing an insertion operation for a queue according to the teachings of the present invention.
Figure 4B:
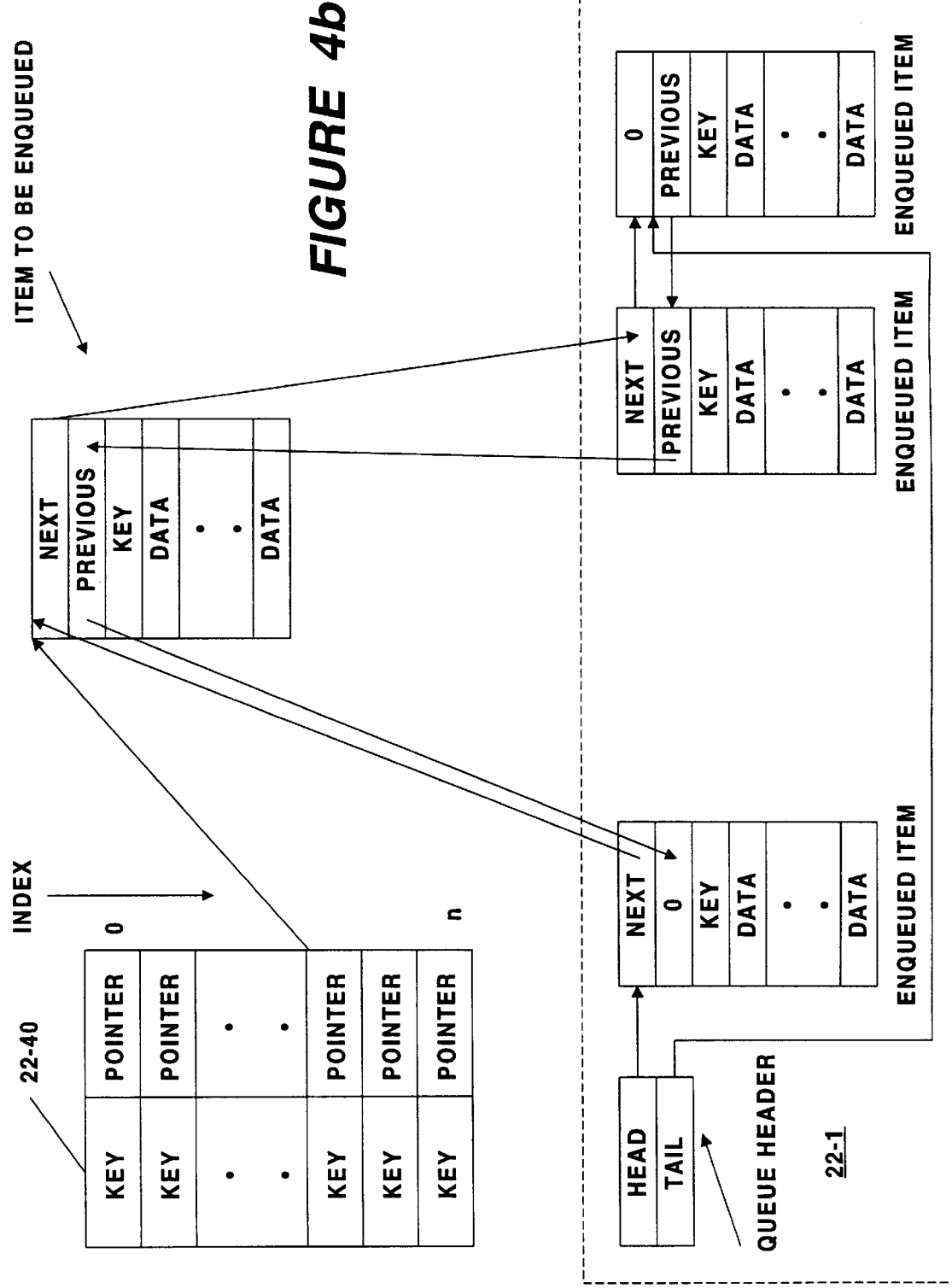

FIGS. 4a and 4b

FIG. 4a illustrates the state of the queue system 22 during normal operation wherein all of the queue and cache key structure locations have been filled with entries as indicated. In FIG. 4a, it is assumed that the fifth key cache item points to the second enqueued item in queue 22-1.

Item Insertion

Figure 6A:
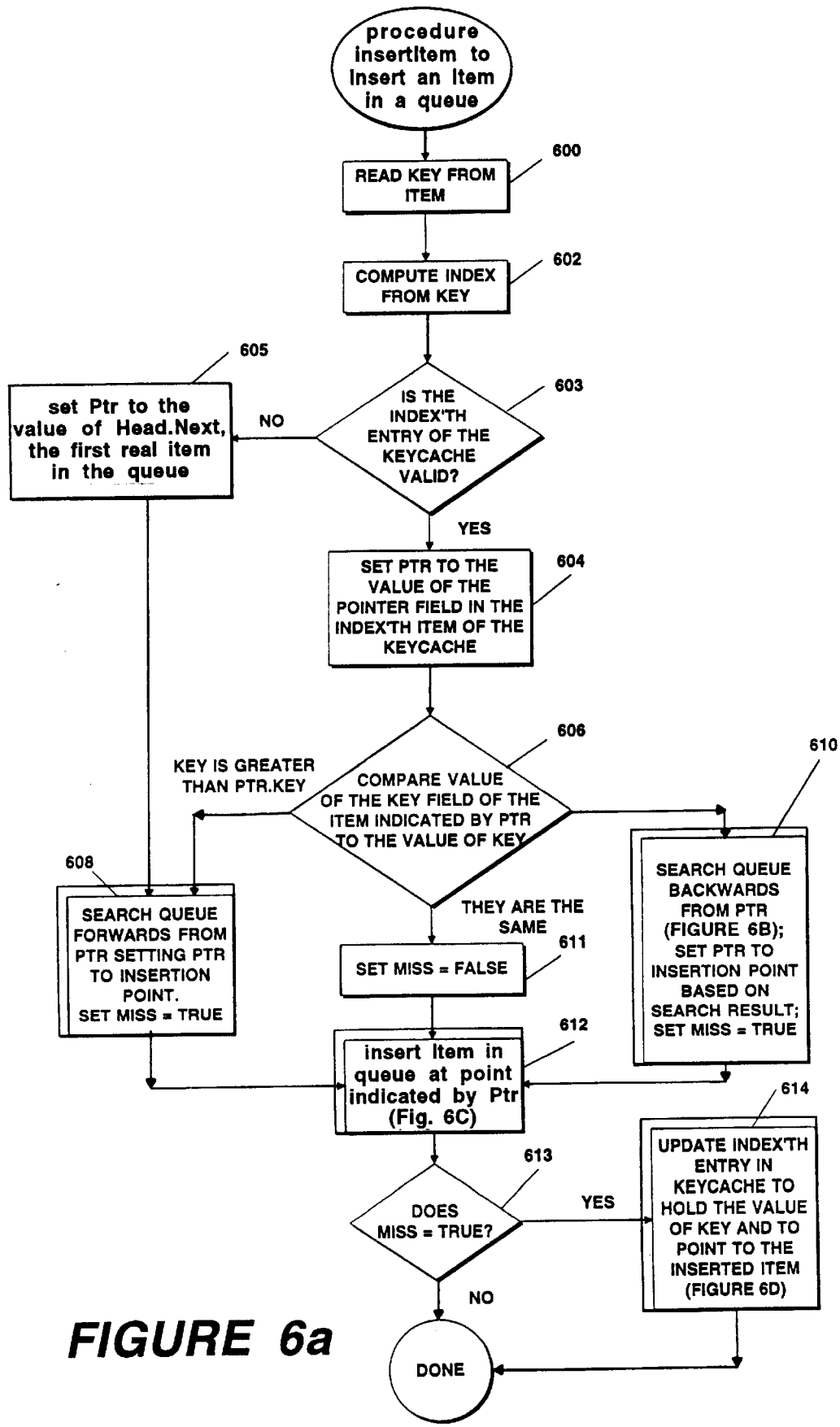
FIGS. 6a through 6e are flow charts used in explaining the operation of the search mechanism of the present invention.
Figure 6B:
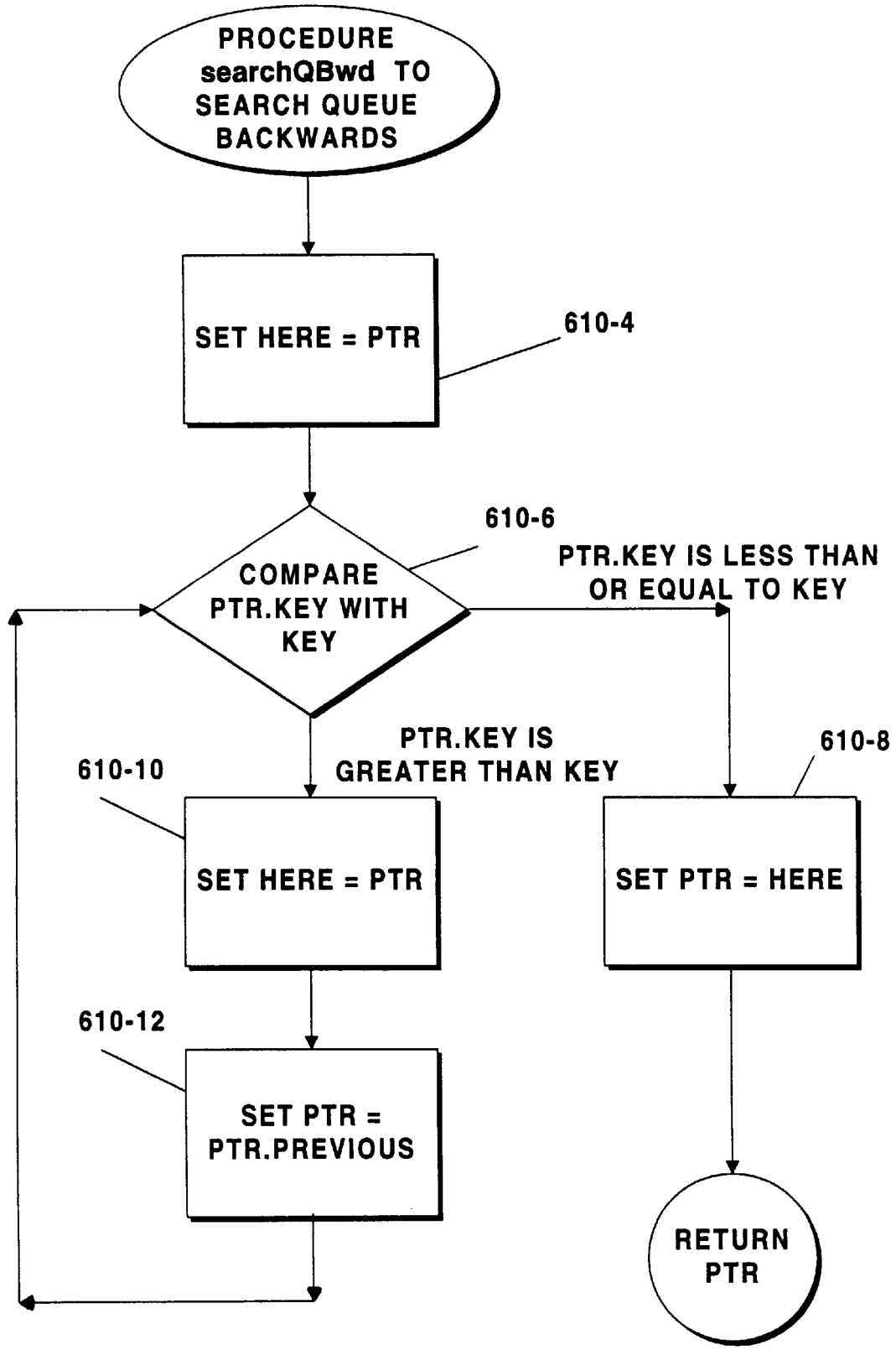

The steps for performing an insertion operation by the search mechanism 22-2 are illustrated in the flow chart of FIG. 6a. From FIG. 6a, it is seen that first, the control mechanism 22-20 reads the key from the data item to be inserted (i.e., block 600). Next, the control mechanism 22-20 computes a key cache index value from the key value contained in the data item to be enqueued (i.e., block 602). As indicated, there are then four cases to consider:

The first case is when the key cache entry is not valid (shown by the Pointer field of the entry being zero). In this case, the mechanism sets the queue pointer Ptr to the first real entry in the queue, the item following First.

The second case is when the key cache entry is valid, and the key value in the item being inserted is greater than the key value in the key cache entry. In this case, the mechanism searches the queue in a forward direction starting at the item indicated by the pointer field of the key cache entry using the queue next item pointer values to find the appropriate point for insertion.

The third case is when the key cache entry is valid and the key value in the item being inserted is less than the key value in the key cache entry. In this case, the mechanism searches the queue in a backward direction starting at the item indicated by the pointer field of the key cache entry using the queue next item pointer values to find the appropriate point for insertion The fourth case is when the key cache entry is valid and the key value in the item is the same as the key value in the key cache entry. In this case, the pointer field of the key cache entry indicates the correct entry point.

It will be assumed by way of example that the key value of the data item being added is greater causing control mechanism 22-20 to perform the QBwd backward procedure operation of block 610 (i.e., a procedure to search a queue backwards from the item indicated by PTR until an entry whose key field is less than or equal to the supplied key is found and which returns a pointer to that item). As indicated, this operation is illustrated in greater detail in FIG. 6b. First, the control mechanism procedure sets its pointer Here to the value contained in the pointer Ptr passed to it which corresponds to the previous item pointer value of the key cache designated enqueued item (i.e. block 610-4). The key field contents of the queue entry pointed to by its pointer Here are then compared with the key value (Key) of the item to be inserted (NewItem) as indicated in block 610-6.

If the key value of the designated enqueued item entry is equal or less than the NewItem key value, control mechanism 22-20 sets the search mechanism Ptr to equal the contents of its Here pointer representing the location of the previous data item (block 610-8). If the key value of the enqueued item entry is greater than the NewItem key value, control mechanism 22-20 performs the operation of block 610-10. That is, control mechanism 22-20 sets the search mechanism pointer Ptr equal to the contents of the Previous pointer field of that queue item to evaluate the next enqueued item (block 610-12).

Control mechanism 22-20 continues to execute the operations of blocks 610-6 and 610-10 until it finds a queue item entry whose key field is less than or equal to the supplied item to be enqueued. When such a queue item is found, control mechanism 22-20 then returns a pointer value designating the location of that enqueued item. Since control mechanism 22-20 carries out a forward search in the same manner as a backward search, using the next pointer values of the enqueued items, no further description of a forward search is deemed necessary.

As indicated in FIG. 6a, the control mechanism 22-20 uses the returned pointer value to insert the NewItem into queue 22-1 as indicated in block 612. That is, the control mechanism 22-20 inserts the NewItem in the queue location designated by the returned pointer value which results in the pointer values of the enqueued items being set as indicated in FIG. 4b.

Figure 6C:
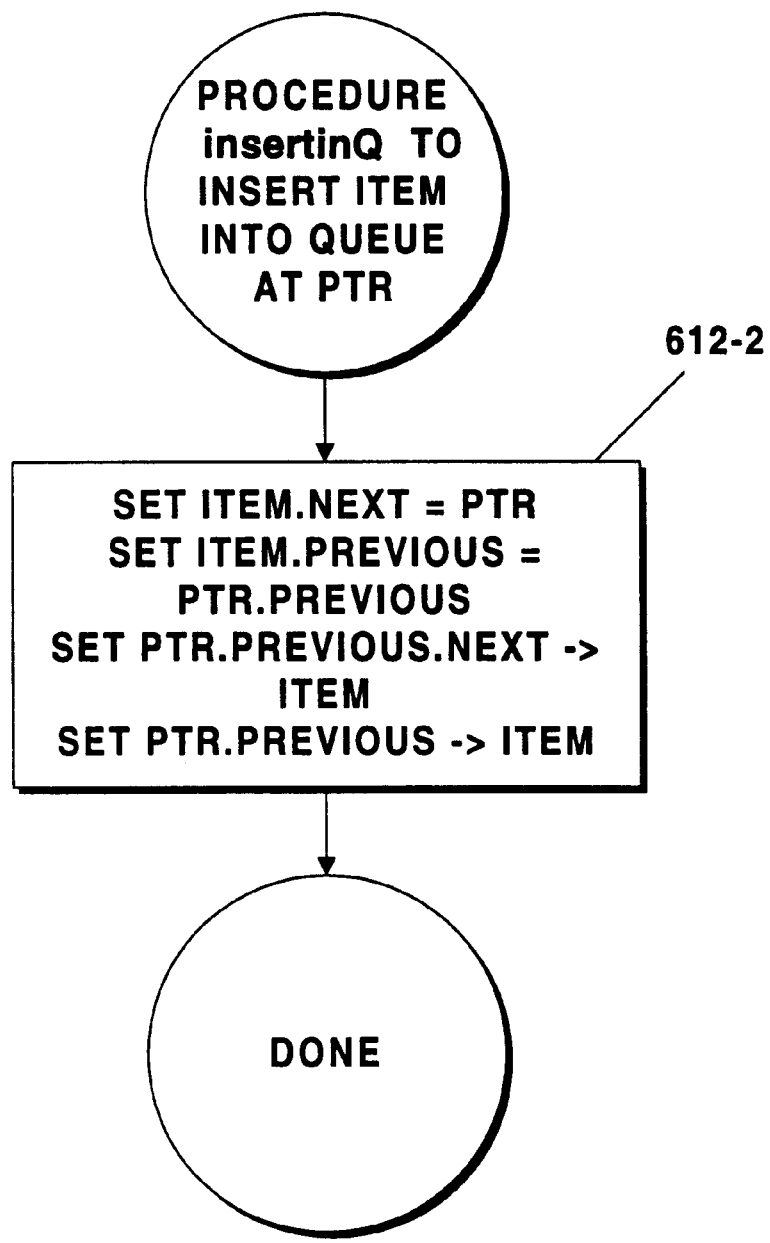

When the queue pointer Ptr points to an item in the body of the queue (i.e., does not indicate the first or last item in the queue), control mechanism 22-20 performs the operations of block 612-2 in the flow chart of FIG. 6c that depicts a procedure to insert an item into a queue at the point indicated by PTR. Note the queues in the preferred implementation always have a first entry and a last entry which may not be removed so the insertion procedure always inserts in the 'middle' of queue. That is, it sets the next pointer value of the NewItem to the value of the queue pointer, sets the next pointer value of the NewItem to the value of the previous pointer of the designated enqueued item, sets the previous pointer of the previous item pointed to by the queue pointer to point at the NewItem and sets the previous pointer of the previous item to point at the NewItem.

Figure 6D:
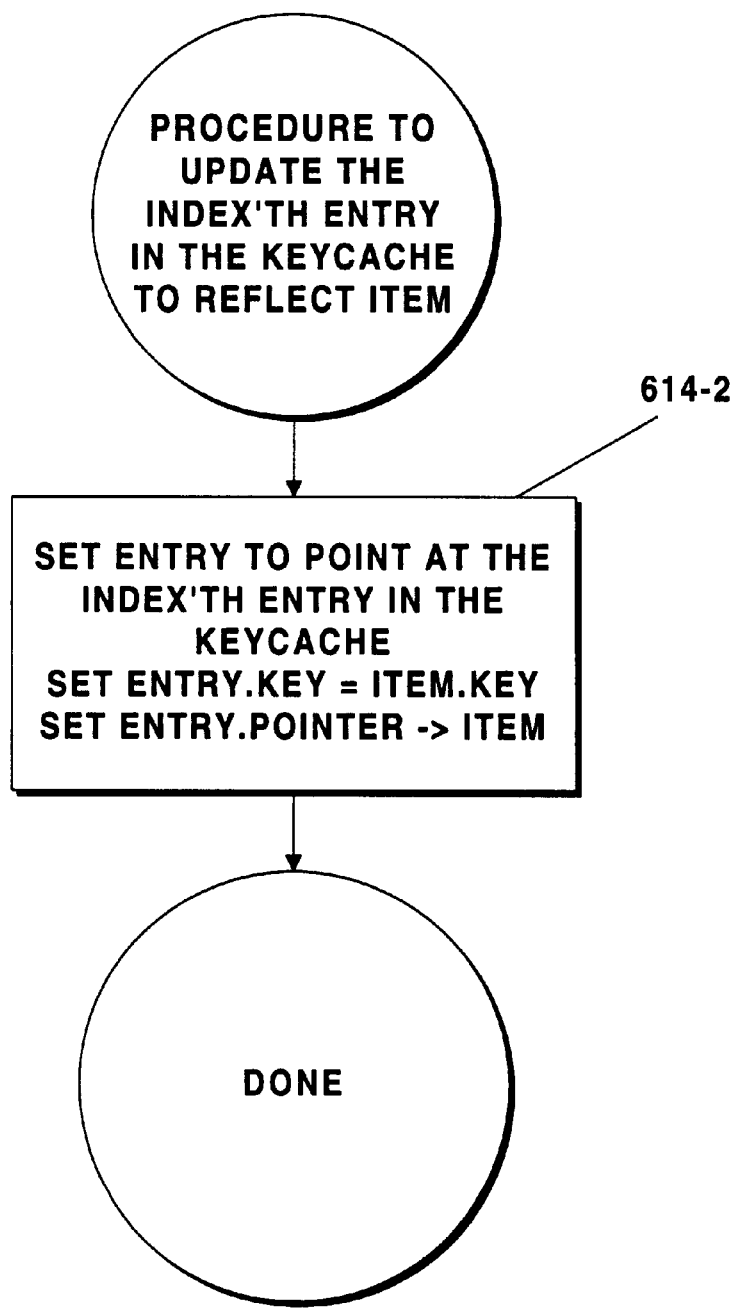

Next, control mechanism 22-20 updates the entry in key cache structure 22-40 in the manner indicated in block 614-2 of the flow chart of FIG. 6d to reflect the insertion of this item and its key value. That is, it sets the pointer field of the entry to point to the new item and sets the time field (key field) to be equal to the time of the new item (NewItem).

Item Removal

Figure 5A:
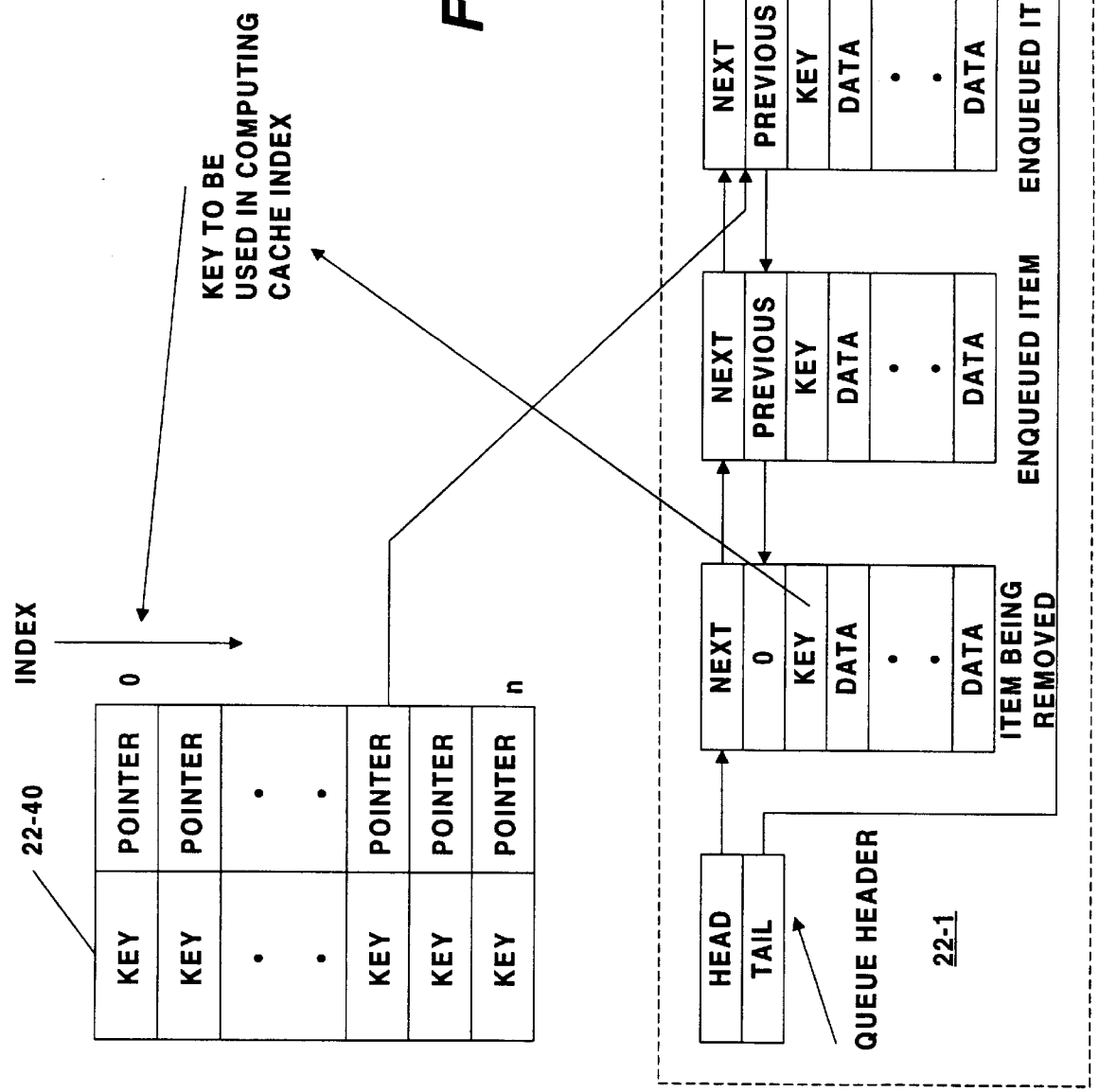
FIGS. 5a and 5b are diagrams used in describing the steps of performing a removal operation for a queue according to the teachings of the present invention.
Figure 5B:
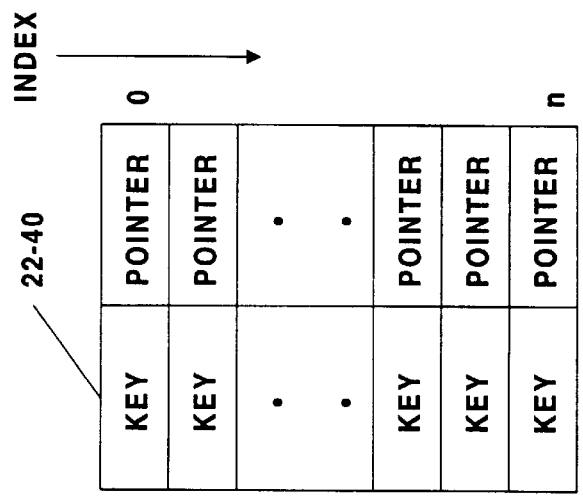
Figure 5B:
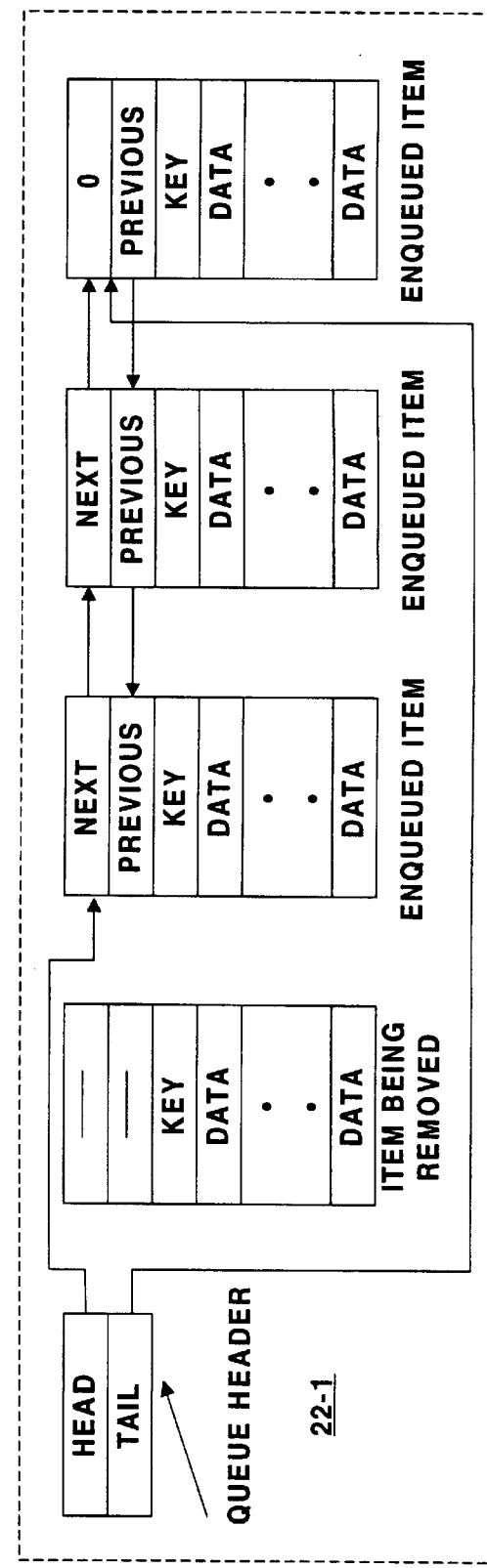
Figure 6E:
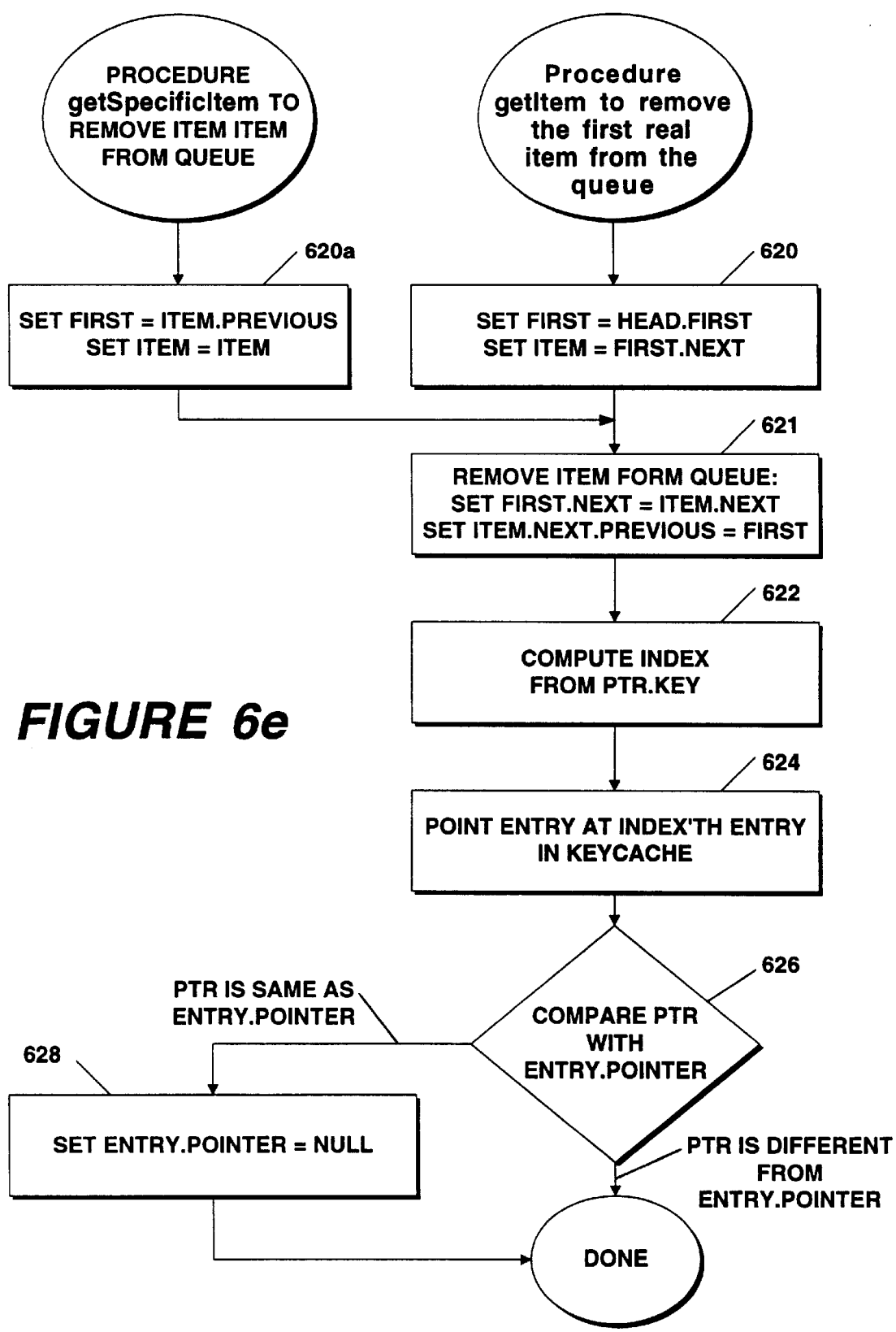

FIGS. 5a and 5b are used to describe the operations to remove the first useful item in the queue performed by the procedure getItem illustrated in the flow chart of FIG. 6e (recall that the actual first and last items are not to be removed). As indicated in FIG. 5a, it is assumed that the fifth key cache item points to the item being removed. The choice of item in the keycache is defined by the computation of the cache key index from the key value of the item being removed. This first useful item is the second item in the queue. The procedure uses two pointer values called 'first' and 'item' to remove the item from the queue.

As indicated in block 620, the procedure sets its "first" pointer equal to Head.Next (i.e., the contents of the next field of the data item pointed to by the queue head pointer, indicating the actual first item). It also sets its "item" pointer equal to first.Next (indicating the second item in the queue 22-1, the item to be removed). Next, the procedure removes the item from the queue by performing the operations of setting the first.Next pointer equal to item.Next and the item.Next.Previous equal to first (block 621). This operation (step) removes all mention (identification) of the item to be removed from the queue.

Next, the procedure computes the key cache index from the key of the data item to be removed and then points the entry at the Index'th entry in the key cache (blocks 622 and 624). The procedure then compares the pointer Ptr to the Entry.Pointer for determining if the pointer is the same (block 626). If it is the same, the pointer field of the entry is set to a NULL or "0" value invalidating the entry (block 628). If the pointer Ptr is different, then the procedure is done.

The queuing mechanism may also be used to remove a specific item known to be in the queue. To remove a particular item the procedure getSpecificItem also illustrated in the flow chart of FIG. 6e may be used. It is provided with the address of the item to be removed.

As indicated in block 620a, the procedure sets its "first" pointer equal to Item.Previous (i.e., the contents of the previous field of the item to be removed indicating the item preceding the item to be removed). It also sets its "item" pointer equal to Item (the item to be removed). Next, the procedure removes the item from the queue by performing the operations of setting the first.Next pointer equal to item.Next and the item.Next.Previous equal to first (block 621). This operation (step) removes all mention (identification) of the item to be removed from the queue. The sequence of operations of the remaining blocks of FIG. 6e would be performed in the same manner as described above.

To remove the first item whose key was smaller than some value, one would, in principle, first search the queue from the front to identify that item, and then remove it. The removal can be done with getSpecificItem( ), just described. The searching could be done using a version of insertItem( ), modified only to call getSpecifiItem( ) instead of insertinQ( ) and to never call updateCache( ).

From the above, it is seen how the search mechanism of the present invention can be used to reduce search time from a time dependent on the number of entries in a queue to a time which is essentially constant. This reduction in search time is a function of the distribution of times for new items and size of the key cache.

The following results have been found by using the queue mechanism as an ordered event queue wherein each event when serviced creates another event at some time in the future and the time is chosen from a uniform distribution. The results shown below are for a queue using 512 events whose "next" time is set to be the current time plus a value chosen randomly from the range 0 to 63 ticks in the future.

An uncached run:

Experiment::NumEvents=512, dt=U[0 . . . 63], CacheSize=0

Service 512 events.

40269 events in 11.12 secs=3622.40 eps; av search distance=334.77

80928 events in 22.33 secs=3623.64 eps; av search distance=334.27

121364 events in 33.52 secs=3621.00 eps; av search distance=334.36

162027 events in 44.77 secs=3619.37 eps; av search distance=334.43

A cached run:

Experiment::NumEvents=512, dt=U[0 . . . 63], CacheSize=8

Service 512 events.

40269 events in 5.98 secs=6725.18 eps; av search distance=165.47

Hits=5045 [12.54] Slops=17601 [43.74] Misses=17593 [43.72]

80928 events in 12.15 secs=6654.49 eps; av search distance=166.14

Hits=10020 [12.39] Slops=35411 [43.80] Misses=35421 [43.81]

121364 events in 18.22 secs=6660.00 eps; av search distance=165.92

Hits=15005 [12.37] Slops=52955 [43.65] Misses=53363 [43.98]

162027 events in 24.33 secs=6657.82 eps; av search distance=165.79

Hits=20114 [12.42] Slops=70793 [43.70] Misses=[43.89] wherein slops are hits which result in a search.

The above results illustrate that a very small cache (8 entries) halves the search distance (from 334 to 166) and also improves the actual event servicing rate from about 3600 eps to about 6600 eps.

An executable description of the queuing system embodying the present invention is provided in the enclosed Appendix.

APPENDIX

It can be simpler to understand how an implementation of the mechanism might work if the description is given in a language more suited to such descriptions than English. The programming language 'C' is such a language and to aid comprehension a description of the behavior of a possible implementation of the mechanism is given in C as a collection of C procedures hereafter. The version of the mechanism described employs the preferred queuing model in which the first and last items in the queue are unremovable and unchangeable. To further increase the utility of this description, two further procedures (uniform( ) and main( )) are included so that the complete description may be compiled and executed given an appropriate C compiler and computer system on which to execute the compiled description. The use of C language structures to represent items and queues and the use of C procedures to describe the sequences of desired operations will be familiar to those skilled in the art and familiar with modern software practices.

```
/*
cqueues.c
*/
#include <stdlib.h>
#include <stdio.h>
typedef long int32;
// definition of an Item
typedef struct item{
    struct item * Next;        // pointer to next item in queue
    struct item * Previous;    // pointer to previous item in queue
    int32 Key;                 // this item's key value
    } Item;
// definition of a KeyCache entry
typedef struct {
    int32 hits;
    Item * Pointer;
    int32 Key;
    } kCacheEntry;
// definition of a KeyCache
#define cacheSize (23)
kCacheEntry KeyCache[cacheSize];
#define minKey (-1L)
#define maxKey (0x7fffffffL)
// definition of a Queue
typedef struct {
    Item * Head;
    Item * Tail;
    Item First;
    Item Last;
```

```
    } Queue;
static void initCache(void);
static void printCache(void);
static void insertItem(Queue * q, Item *item);
static void insertinQ(Item * Ptr, Item * item);
static Item * searchQFwd(Item * Ptr, int32 Key);
static Item * searchQBwd(Item * Ptr, int32 Key);
static void updateCache(Item * item, int32 Index);
static Item * getItem(Queue * theQ);
static int32 uniform(int32 base, int32 limit);
/* ---------------------- initCache ------------------------ */
static void initCache(void) {
    int32 i;
    for (i = 0; i < cacheSize; i++) {
        KeyCache[i].Key = minKey;      // set to arbitrary value
        KeyCache[i].Pointer = NULL;    // set to invalid value
        KeyCache[i].hits = 0;          // set to 0
        }
    }
/* ---------------------- printCache ------------------------ */
static void printCache(void) {
    int32 i;
    printf(" Cache contents: ");
    for (i = 0; i < cacheSize; i++) {
        printf(" %3ld::Key=%6ld, ptr = 0x%08lx, hits = %ld ",
            i, KeyCache[i].Key, KeyCache[i].Pointer,
KeyCache[i].hits);
        }
    }
/* ---------------------- initQ ------------------------ */
static void initQ(Queue * q) {
    /* initialise the indicated queue so that q -> First is first
item, q -> Last is last item */
    q -> Head = &(q -> First);
    q -> Tail = &(q -> Last);
    q -> First.Key = minKey;
    q -> Last.Key = maxKey;
    q -> First.Previous = NULL;
    q -> First.Next = q -> Tail;
    q -> Last.Previous = q -> Head;
    q -> Last.Next = NULL;
    }
/* ---------------------- computeIndex ------------------------ */
static int32 computeIndex(int32 Key) {
    int32 index;
    index = Key % cacheSize;
    if (index < 0) index = -index;
    return index;
    }
/* ---------------------- insertItem ------------------------ */
void insertItem(Queue * q, Item * item) {
    Item * Ptr;
    int32 Index, miss;
    int32 Key, cachedKey;
    Key = item -> Key;
    Index = computeIndex(Key);
    cachedKey = KeyCache[Index].Key;
    Ptr = KeyCache[Index].Pointer;
    miss = TRUE;
    // first check to see if entry is valid
    if (Ptr == NULL) {
        // invalid entry; need to search from start
        Ptr = q -> Head -> Next;
        Ptr = searchQFwd(Ptr, Key);
        }
    else {
        // yes, valid; now decide what to do. .
        if (Key > cachedKey) {
            /* a miss; search the queue forwards until insertion point
is found */
            Ptr = searchQFwd(Ptr, Key);
            }
        else if (Key < cachedKey) {
            /* a miss; search the queue backwards until insertion point
is found */
            Ptr = searchQBwd(Ptr, Key);
            }
        else {
            miss = FALSE;
```

```
                KeyCache[Index].hits++;
            }
        }
        // now insert item in queue
        insertinQ(Ptr, item);
        if (miss) updateCache(item, Index);
    }
/* ---------------------- searchQBwd ------------------------ */
static void updateCache(Item * item, int32 Index) {
    // updates the keyCache entry Index to indicate item
    kCacheEntry * Entry;
    Entry = &(KeyCache[Index]);   // point at Index'th entry
    Entry -> Key = item -> Key;    // update its key
    Entry -> Pointer = item;       // update its pointer
    Entry -> hits = 0;
}
/* ---------------------- insertinQ ------------------------ */
static void insertinQ(Item * Ptr, Item * item) {
    // insert item in queue in front of item indicated by Ptr
    item -> Previous = Ptr -> Previous;    /* item's previous is
Ptr's previous */
    item -> Next = Ptr;                    // item's next is Ptr
    Ptr -> Previous -> Next = item;        /* what used to point
at Ptr now indicates item */
    Ptr -> Previous = item;                /* and Ptr's previous
is item */
}
/* ---------------------- searchQFwd ------------------------ */
static Item * searchQFwd(Item * Ptr, int32 Key) {
    /* searches the queue containing the item indicated by Ptr
forwards (via the Next fields) */
    // to find correct place to insert an item with key value Key
    /* there is no need to check for end conditions because the
queue always contains an entry */
    // with key value maxKey
    Item * Here;
    Here = Ptr;
    while (Ptr -> Key < Key) {
        Here = Ptr;
        Ptr = Ptr -> Next;
    }
    return Here;  // return the last item which had a smaller key
}
/* ---------------------- searchQBwd ------------------------ */
static Item * searchQBwd(Item * Ptr, int32 Key) {
    /* searches the queue containing the item indicated by Ptr
backwards (via the Previous fields) */
    // to find correct place to insert an item with key value Key
    /* there is no need to check for start conditions because the
queue always contains an entry */
    // with key value minKey
    Item * Here;
    Here = Ptr;
    while (Ptr -> Key > Key) {
        Here = Ptr;
        Ptr = Ptr -> Previous;
    }
    return Here;     // return the last item which had a larger key
}
/* ---------------------- getItem ------------------------ */
static Item * getItem(Queue * theQ) {
    // removes first real item from theQ
    Item * item, * first;
    int32 Index;
    first = theQ -> Head;
    item = first -> Next;
    // heal up the queue
    first -> Next = item -> Next;
    item -> Next -> Previous = first;
    // fix up cache
    Index = computeIndex(item -> Key);
    if (KeyCache[Index].Pointer == item) {
        // we're in the cache; invalidate the entry
        KeyCache[Index].Pointer = NULL;
        KeyCache[Index].Key = -1;
        KeyCache[Index].hits = 0;
    }
    return item;
}
/* ---------------------- uniform ------------------------ */
static int32 uniform(int32 base, int32 limit) {
/* returns a uniformly distributed rv in base. .limit
    the smallest number returned is base
    the largest number returned is base + limit - 1
    base, limit MUST both be >= 0
    limit MUST be > base
    these are NOT checked
*/
#define rvM ((1L << 31) - 1L)
#define rvd (16807L)
#define rvquotient (rvM/rvd)
#define rvremainder (rvM%rvd)
static int32 seed = 1;
    int32 result;
    result = seed;
    result = (rvd * (result % rvquotient)) -
             (rvremainder * (result / rvquotient));
    if (result <= 0) {
        result += rvM;
    }
    seed = result;
    /* got a uniform rv in 0. .2**31, convert to uniform rv in
base. .limit */
    result = result % (limit - base);
    if (result < 0) result = - result;
    return (base + result);
}
/* ---------------------- main ------------------------ */
void main(void) {
    Queue * theQ;
    int32 numItems, theTime, i;
    printf(" Cached Queues Method starting. . ");
    // create an empty queue
    theQ = malloc(sizeof(Queue));
    initQ(theQ);
    // initialise the keyCache
    initCache ();
    printf(" queue and cache initialised. ");
    // insert 1000 items on the queue with keys all equal to 100
    theTime = 100;
    for (numItems = 0; numItems < 1000; numItems++) {
        Item * item;
        item = malloc(sizeof(Item));
        item -> Key = theTime;
        insertItem(theQ, item);
    }
    printf(" %ld items placed on queue; starting run ", numItems);
    // take items from the front an re-queue some amount later
    for (i = 0; i < 100000; i++) {
        Item * item;
        int32 dt;
        item = getItem(theQ);
        theTime = item -> Key;
        dt = 10 * (uniform(1, 10));     /* increment time in amounts
of 10 between 10 and 100 */
        item -> Key = theTime + dt;
        insertItem(theQ, item);
        if (i < 10) printCache();
        if (i % 10000 == 0) printCache();
    }
    printCache ();
    printf(" Done; completed %ld removals and insertions ", i);
}
```

From the above, it is seen how the search mechanism of the present invention improves system performance. It will be appreciated that many changes may be made to the preferred embodiment of the present invention without departing from its teachings. For example, the present invention may be used in different types of data processing systems, such as multiprocessing systems with the addition of appropriate locking mechanisms. The present invention may also be used with other data item formats, etc.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

I claim:

1. A queue system including a queue and a queue search mechanism, the queue containing a number of locations for storing a corresponding number of queued data items, each queued data item having a number of fields, a pair of the number of fields containing information for indicating locations of preceding and succeeding queued data items and at least one field for storing a key value, the queued data items being ordered in the queue according to key value, the queue search mechanism comprising:

(a) a key cache structure having a number of entry locations for storing a corresponding number of cache data item structures, each cache data item structure having a number of fields, a first field for storing a unique key value representative of a queued data item and a second field for storing a queue address pointer value designating the location of a queued data item; and, (b) a control mechanism for performing queue management operations, the control mechanism when inserting a new data item in the queue, first generates a cache index value derived from the key value contained in the new data item to be enqueued for accessing an entry location in the key cache structure, the control mechanism next determines the location in the queue into which the new data item is to be inserted by comparing the key value of the queued data item initially specified by the pointer value of the accessed entry location and as a function of the results of the comparison, searches through successive queued data items in a direction defined by the comparison until a match is obtained with the key value of the new data item defining the appropriate point in the queue into which the new data item is to be inserted.

2. The system of claim 1 wherein the control mechanism is operative upon detecting an identical comparison between the key value of the new data item and the key value of the designated queued data item to insert the new data item at the location specified by the pointer value of the accessed key cache entry.

3. The system of claim 1 wherein the control mechanism is operative upon detecting that the key value of the new data item is greater than the key value of the designated queued data item to search the queue in a forward direction starting with the location specified by the pointer value.

4. The system of claim 1 wherein the control mechanism is operative upon detecting that the key value of the new data item is less than the key value of the queued data item to search the queue in a backwards direction starting with the queued data item specified by the pointer value.

5. The system of claim 1 wherein following insertion of the new data item into the queue, the control mechanism operates to update the key cache structure to reflect the insertion of the new data item into the queue.

6. The system of claim 5 wherein the key cache structure is updated by causing the key value of the new data item to be written into the first field of key cache data entry accessed and a pointer value pointing to the insertion point in the queue into which the new data item was enqueued.

7. The system of claim 1 wherein the queue has first and last entries which are not removable causing new data items to be inserted in the middle of the queue enabling new data items to be more quickly inserted and deleted.

8. The system of claim 1 wherein the queue system is initialized to a predetermined state before utilization by an application, the initialization causing the first and second fields of each key data structure in the key cache structure to be forced to contain a unique key value and a zero value respectively.

9. The system of claim 8 wherein the unique key values of each key cache data structure is selected in a predetermined manner for distributing key values uniformly relative to the number of locations contained in the key cache structure.

10. The system of claim 9 wherein the key value represents a particular time or priority allocation.

11. The system of claim 10 wherein the key value represents a time value and the control mechanism generates the cache index value by performing a mathematical function on the time value to produce a result having values within a range of 0 through n inclusive when the key cache structure has n+1 number of locations.

12. The system of claim 11 wherein the mathematical function involves computing a remainder value for the cache index value by dividing the time value by the value n+1.

13. The system of claim 1 wherein the queue always contains a first and last item which have respectively, a key value smaller than any key to be used in conjunction with the queue system and a key value larger than any key to be used in conjunction with the queue system.

14. The system of claim 1 wherein the control mechanism includes first and item pointers, the control mechanism operates to remove an enqueued data item from the queue by setting the first and item pointers to values for identifying the first actual item in the queue and the item to be removed from the queue, the control mechanism subsequently computes the key cache index value from the key of the data item to be removed and then causes the pointer field of the item to be removed to point to indexed key cache data entry.

15. A method for operating a queue system including a queue using a queue search mechanism, the queue containing a number of locations for storing a corresponding number of queued data items, each queued data item having a number of fields, a pair of the number of fields containing information for indicating locations of preceding and succeeding queued data items and at least one field for storing a key value, the queued data items being ordered in the queue according to key value, the queue search mechanism comprising:

(a) storing in a key cache structure having a number of entry locations included in the search mechanism, a corresponding number of cache data item structures, each cache data item structure having a number of fields, a first field for storing a unique key value representative of a queued data item and a second field for storing a queue address pointer value designating the location of a queued data item;

(b) performing queue management operations using a control mechanism included in the search mechanism to insert a new data item in the queue by first generating a cache index value by converting the key value in the new data item to be enqueued into a pointer value within an established range of values for accessing an entry location in the key cache structure, next determining that the accessed cache data entry is valid, then comparing the key value of a valid queued data item initially specified by the pointer value of the accessed entry location with the key value of the new data item to be enqueued and when the key value of the data item to be enqueued is greater than the key value of the valid queued data item, searching the queue entries from that point until a queued data item having a key value which is equal to the key value of the new data item.

* * * * *